United States Patent
Pandey (10) Patent No.: US 9,310,463 B2
(45) Date of Patent: Apr. 12, 2016

(54) DETECTING INCORRECTLY PLACED ACCESS POINTS

(71) Applicant: Cisco Technology, Inc., San Jose, CA (US)

(72) Inventor: Santosh Ghanshyam Pandey, Newark, CA (US)

(73) Assignee: Cisco Technology, Inc., San Jose, CA (US)

(*) Notice: Subject to any disclaimer, the term of this patent is extended or adjusted under 35 U.S.C. 154(b) by 118 days.

(21) Appl. No.: 14/072,851

(22) Filed: Nov. 6, 2013

(65) Prior Publication Data

US 2015/0126215 A1 May 7, 2015

(51) Int. Cl.
*G01S 5/02* (2010.01)
*H04W 64/00* (2009.01)

(52) U.S. Cl.
CPC .............. *G01S 5/0252* (2013.01); *G01S 5/021* (2013.01); *G01S 5/0242* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 8,571,578 | B1* | 10/2013 | Chen | G01S 5/0009 455/456.1 |
| 8,874,131 | B2* | 10/2014 | Khorashadi | H04W 4/04 455/456.1 |
| 2007/0004428 | A1 | 1/2007 | Morgan et al. | |
| 2010/0026513 | A1* | 2/2010 | Pandey | G06K 7/0008 340/8.1 |
| 2010/0159958 | A1* | 6/2010 | Naguib | G01S 5/021 455/457 |
| 2010/0329123 | A1* | 12/2010 | Viswanathan | H04L 41/12 370/241 |
| 2011/0301912 | A1* | 12/2011 | Pandey | H04W 64/00 702/150 |
| 2012/0129559 | A1* | 5/2012 | Pochop, Jr. | H04W 16/18 455/507 |
| 2013/0072228 | A1 | 3/2013 | Naguib et al. | |
| 2013/0267242 | A1* | 10/2013 | Curticapean | G01S 5/0242 455/456.1 |
| 2013/0288704 | A1* | 10/2013 | Wirola | H04W 64/00 455/456.1 |

(Continued)

FOREIGN PATENT DOCUMENTS

| CN | 1992658 A | 7/2007 |
|---|---|---|
| EP | 2203019 A1 | 6/2010 |

(Continued)

OTHER PUBLICATIONS

Bumgon Kim et al: "Indoor localization for Wi-Fi devices by cross-monitoring AP and weighted triangulation", Consumer Communications and Networking Conference (CCNC), 2011 IEEE, Jan. 9, 2011, pp. 933-936.

(Continued)

*Primary Examiner* — Hilina K Demeter
(74) *Attorney, Agent, or Firm* — Patterson + Sheridan, LLP (57) ABSTRACT

Embodiments provide techniques for detecting access points on a position map, particularly incorrectly placed access points. For each access point in a plurality of access points, a subset of the plurality of access points that neighbor the access point are identified. Embodiments estimate a location of the access point, based on a respective indication of signal strength from each neighboring access point in the subset of access points and a respective position of each of the neighboring access points in position map. A difference between a recorded position of the access point in the position map and the estimated location of the access point is calculated. Embodiments then determine that the position within the position map for a first one of the plurality of access points is incorrect, based on the determined difference for the first access point.

17 Claims, 6 Drawing Sheets

(56) References Cited

U.S. PATENT DOCUMENTS

| | | | |
|---|---|---|---|
| 2014/0073363 A1* | 3/2014 | Tidd | G01S 5/0242 455/456.5 |
| 2014/0206380 A1* | 7/2014 | Do | H04W 16/20 455/456.1 |
| 2014/0236476 A1* | 8/2014 | Khorashadi | G01C 21/206 701/445 |
| 2014/0274109 A1* | 9/2014 | Venkatraman | G01S 5/0252 455/456.1 |
| 2015/0045054 A1* | 2/2015 | Emadzadeh | H04W 4/043 455/456.1 |

FOREIGN PATENT DOCUMENTS

| | | |
|---|---|---|
| WO | 03021851 A2 | 3/2003 |
| WO | 2008006077 A2 | 1/2008 |

OTHER PUBLICATIONS

International Search Report for PCT/US2014/064233, Feb. 26, 2015.

* cited by examiner

DETECTING INCORRECTLY PLACED ACCESS POINTS

TECHNICAL FIELD

Embodiments presented in this disclosure generally relate to floor map verification, and more specifically to detecting misplaced access points within a floor map based on measures of signal strength between the access points.

BACKGROUND

Wireless networks such as wireless local area networks (WLANs) are quickly becoming pervasive, and WLANs that conform to the IEEE 802.11 standard are particularly ubiquitous. A WLAN can be made up of one or more wireless access points. A wireless access point is generally a device that enables wired communication devices (e.g., network devices) to connect to and to transmit data through a wireless network using wireless technologies (e.g., Wi-Fi, Bluetooth, or related standards). For example, an access point could connect to a network device (e.g., an edge device) and could relay data between wireless client devices (e.g., personal computers, printers, mobile devices, etc.) and the network device. The access point could also be combined with a wireless network device, such as in a wireless router.

Generally, a given access point will have a fixed area in which it can provide an acceptable signal strength. In order to create a WLAN spanning a larger area, network engineers will oftentimes use multiple access points in a wired network in order to provide wireless access to client devices within the larger area. The access points within the WLAN may work in conjunction to provide network access for the client devices, and may be managed by a WLAN controller. The WLAN controller generally performs management functions for the plurality of access points within the wireless network, e.g., automatic adjustments to radio frequency (RF) power, channels, authentication, and/or security associated with the access points.

In many cases, wireless networks are deployed in areas too large to be covered by a single wireless access point. That is, a single wireless access point is generally capable of providing network access for a fixed area. As the area covered by the wireless network increases, so does the number of access points and the difficulty of arranging and managing the access points. To assist network engineers in managing such networks, a position map may be created, e.g., using blueprints or other drawings of a facility. Such a position map may specify, for example, a physical position of each of the access points within the physical environment. A network engineer could then use such a map for RF coverage optimization functions, such as defining optimal channels and power level selection for each of the access points, as well as WLAN location-based services such as client device tracking. The position map may be created manually by a network administrator importing a set of floor plans and manually selecting access point locations within the map corresponding to the physical access points within the physical environment. However, such a manual process is oftentimes prone to human errors, and once an incorrect position is assigned to an access point within the position map, it can be a challenging and time consuming task to identify and correct the error.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

One embodiment provides a method for detecting an incorrectly placed access point on a position map. For each access point in a plurality of access points, a subset of the plurality of access points that neighbor the access point are identified. Embodiments estimate a location of the access point, based on a respective indication of signal strength from each neighboring access point in the subset of access points and a respective position of each of the neighboring access points in position map. A difference between a recorded position of the access point in the position map and the estimated location of the access point is calculated. Embodiments then determine that the position within the position map for a first one of the plurality of access points is incorrect, based on the determined difference for the first access point.

Another embodiment provides a method that includes generating a set of signal strength and distance data for each access point in a plurality of access points. Generating the set of signal strength and distance data includes identifying a subset of the plurality of access points that neighbor the access point. Additionally, the generating includes collecting indications of signal strength for each of the access points in the subset, relative to the access point, and calculating a distance between the access point and each of the access points in the subset, based on the position map. The method also includes generating a line of best fit to the set of signal strength and distance data for each of the plurality of access points, and further includes determining a likelihood value for each of the plurality of access points, based on the line of best fit and the indication of signal strength and calculated distance for the access point. Moreover, the method includes determining that the position within the position map for a first one of the plurality of access points is likely to be incorrect, based on the determined likelihoods for each of the plurality of access points.

Example Embodiments

Embodiments generally provide techniques for identifying incorrectly placed access points within a position map. As used herein, a "position map" is a data structure that identifies a position for each of a plurality of access points within a physical environment. Such positions may be specified, for example, using coordinates that identify a particular position within the physical environment. As used herein, a position of an access point within a position map is said to be "incorrect" when the access point's position within the position map does not correspond to the access point's position within the physical environment. For example, a position map could specify coordinates indicating that a particular access point is located within a conference room of a physical environment, while the particular access point could actually be located in a room adjacent to the conference room. In such an example, the particular access point's position within the position map would be incorrect, as the position within the position map does not match the actual position of the physical access point.

Figure 1:
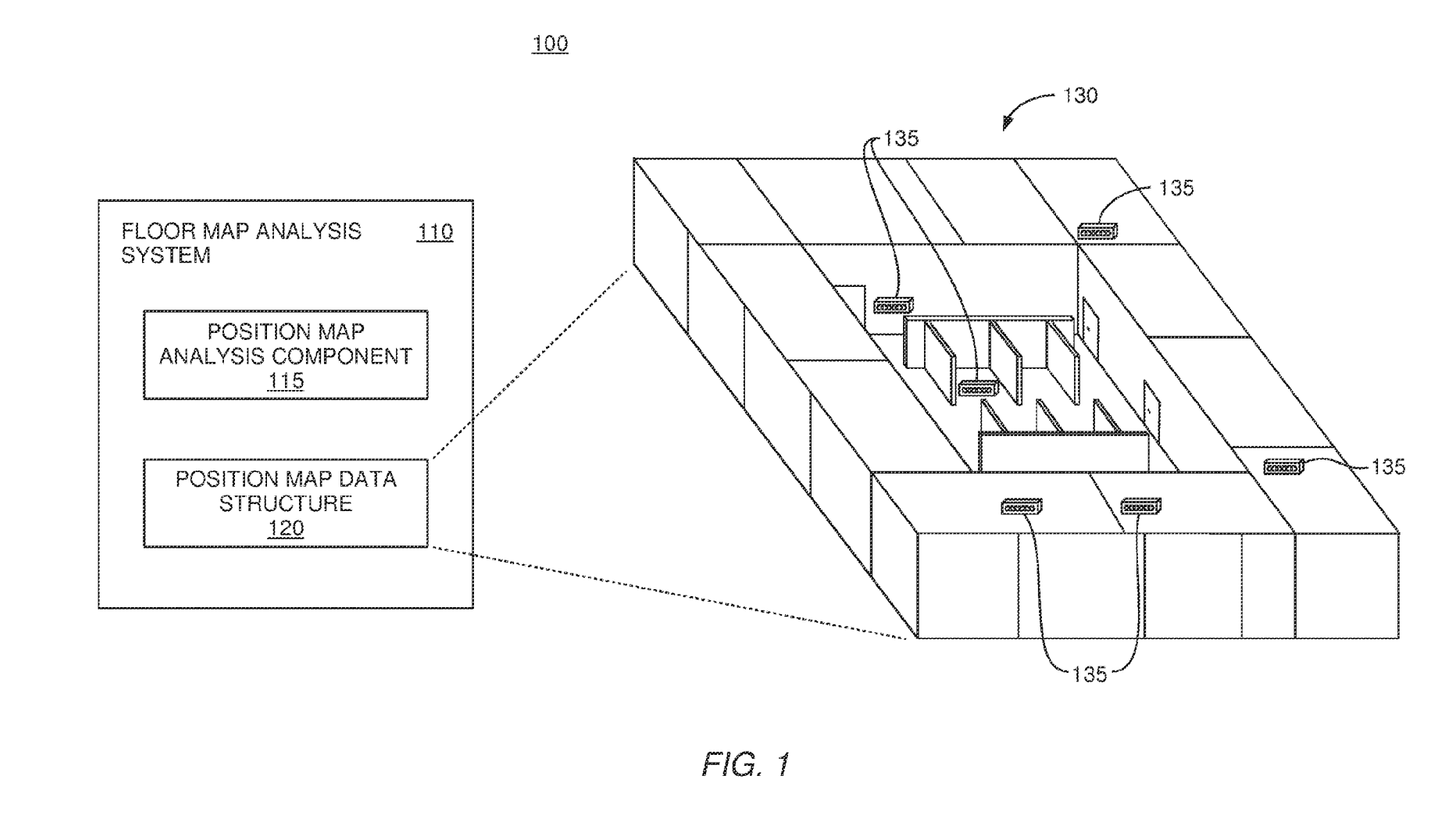
FIG. 1 is a diagram illustrating an interaction between a position map analysis component and a physical environment, according to one embodiment described herein.

FIG. 1 is a diagram illustrating an interaction between a position map analysis component and a physical environment, according to one embodiment described herein. As shown, the illustration 100 includes a position map analysis system 110 and a physical environment 130. The position map analysis system 110 includes a position map analysis component 115 and a position map data structure 120. The physical environment 130 represents a floor of a physical building having multiple access point devices 135 placed throughout.

Generally, the position map analysis component 115 is configured to detect incorrectly placed access points within the position map data structure 120 (i.e., access points whose position within the position map 120 does not match the position of the physical access point 135 within the physical environment 130). For example, the position map analysis component 115 could, for each access point in a plurality of access points, identify a subset of the plurality of access points that neighbor the access point. Generally, access points within a position map can be classified as "neighbors" when the access points are within the radio frequency (RF range of one another.

In a particular embodiment, relationships amongst the access points within the position map can be classified as one of a parent, a child and a neighbor. For instance, a parent access point could be defined as an access point that offers a "best route" to a root access point, where the parent can be the root access point itself or a mesh access point. The "best route" can be determined based on an ease value, which is calculated using a signal-to-noise ratio and link hop value of each neighboring access point. The access point having a higher ease value can be selected for the best route. Additionally, a child access point could select the parent access point as the best route back to the root access point. In such an embodiment, a neighbor access point could be an access point within RF range of another access point, but that is not selected as either the parent or the child, due to having an ease value lower than the parent's ease value.

Once the neighboring access points are identified, the position map analysis component 115 could estimate a location of the access point, based on a respective indication of signal strength from each neighboring access point in the subset of access points and a respective position of each of the neighboring access points in position map. The indication of signal strength could be, for example, a received signal strength indication (RSSI) measure. Other examples of the indication of signal strength include, without limitation, a time of arrival measurement, a one way transit time measurement and a round trip time measurement. More generally, any metric that scales with the physical distance between access points can be used, consistent with the functionality described herein.

The position map analysis component 115 could estimate the access point's position by estimating a distance between the access point and each of its neighbors, based on the indication of signal strength between the access point and each neighbor. For example, a weaker indication of signal strength can represent a further distance between the two access points, and a stronger indication of signal strength can represent a shorter distance between the two access points. The position map analysis component 115 could then estimate the access point's position, based on the positions of the neighboring access points within the position map data structure 120.

The position map analysis component 115 could then calculate a difference between a recorded position of the access point in the position map 120 and the estimated location of the access point. The position map analysis component 115 could then determine that the position within the position map for a particular one of the plurality of access points is incorrect, based on the calculated differences. Here, a greater calculated difference between the position of the access point within the position map 120 and the estimated position may indicate an increased likelihood that the position of the access point within the position map 120 is incorrect. As such, the position map analysis component 115 could select the access point having the greatest calculated difference as an access point having an incorrect position within the position map 120.

In one embodiment, the position map analysis component 115 is configured to calculate an error value for each of the access points and to select the access point(s) having the greatest error values as having an incorrect position(s) within the position map 120. For example, the position map analysis component 115 could calculate an error for each access point by determining the difference between the access point's position within the position map and the estimated position for the access point. Additionally, since the incorrectly placed access point within the position map can potentially be one of the access point's neighbors (which could also have an effect on the estimated position for the access point), the position map analysis component 115 could add the error values for each of the neighboring access points to the access point's error value to generate a total error value for the access point. The position map analysis component 115 could generate such a total error value for each of the access points, and could select the access point(s) having the greatest total error value as the incorrectly placed access point(s) within the position map. In one embodiment, the position map analysis component 115 is configured to weight each access point's own error value more than the neighboring access points' error values when calculating the total error values (e.g., by applying a 2× multiplier to the access point's own error value).

Figure 2:
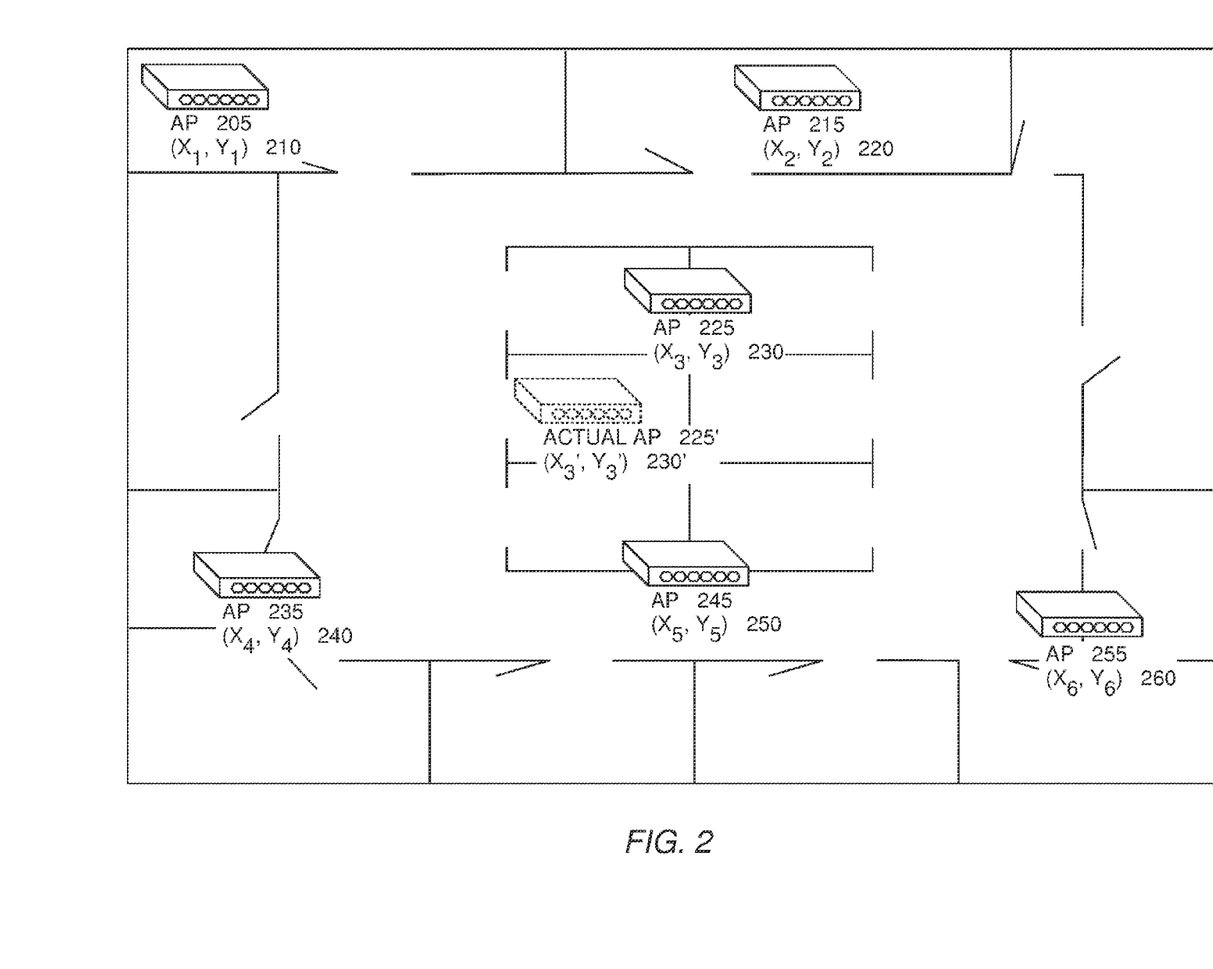
FIG. 2 illustrates access point positions within a physical environment, according to one embodiment described herein.

An example will now be discussed with respect to FIG. 2, which illustrates access point positions within a position map and a physical environment, according to one embodiment described herein. As shown, the illustration 200 includes an access point 205 having coordinates 210, an access point 215 having coordinates 220, an access point 225 having coordinates 230, an access point 235 having coordinates 240, an access point 245 having coordinates 250 and an access point 255 having coordinates 260. Additionally, the illustration 200 depicts a physical access point 225' having actual coordinates 230'. Here, the physical access point 225' corresponds to the access point 225 within the position map, and the access point 225 would be considered "incorrect" within the position map, as the coordinates 230 do not match the coordinates 230' of the physical access point 225' within the physical environment.

In one embodiment, the position map analysis component 115 is configured to plot a line of best fit to a set of signal strength and distance data, in order to detect an access point having an incorrect position within a position map data structure. For example, the position map analysis component 115 could generate a set of signal strength and distance data, by, for each access point in a plurality of access points, identifying a subset of the plurality of access points that neighbor the access point. Additionally, in generating the set of data, the position map analysis component 115 could collect indications of signal strength for each of the access points in the subset, relative to the access point. As discussed above, the indication of signal strength can be a measure of RSSI between the access points. In some embodiments, the access points may already maintain signal strength information for each of the neighboring access points, in which case the position map analysis component 115 could simply access this existing information. In particular embodiments, the indication of signal strength can be another metric(s) that scales with the physical distance between access points, such as a time of arrival, a one-way transit time and a round-trip time.

The position map analysis component 115 could also calculate a distance between the access point and each of the neighboring access points, based on the positions of the access points within the position map. Generally speaking, any technique for use in calculating the distance between two points may be used, consistent with the functionality described herein. As one example, in an embodiment where positions are specified using coordinates, the position map analysis component 115 could calculate the distance using the formula:

$$\text{Distance} = \sqrt{(x_2 - x_1)^2 + (y_2 - y_1)^2} \quad \text{Equation 1—Distance Calculation}$$

Once the set of signal strength and distance data is determined, the position map analysis component 115 could generate a line of best fit to the set of signal strength and distance data for each of the plurality of access points. For example, the position map analysis component 115 could fit a path loss model to the set of data for a particular access point in order to generate the line of best fit. In doing so, the position map analysis component 115 could exclude data from access points neighboring the access point.

The position map analysis component 115 could then determine a likelihood value for each of the access point's neighbor's indications of signal strength (e.g., an RSSI measurement), based on the line of best fit and the indication of signal strength and calculated distance for the access point. For instance, the position map analysis component 115 could calculate a negative log likelihood for each RSSI measurement, using the following equation:

Negative Log Likelihood of Signal Strength Indication $$-\log\_\text{likelihood}_j = \frac{(rssi_{ij} - rssi\_bestfit_{ij})^2}{2 \ast \text{standard deviation}^2} + \log\left(\frac{1}{\text{standard deviation} \ast \sqrt{2\pi}}\right) \quad \text{Equation 2}$$

Here, the $rssi\_bestfit_{ij}$ represents the RSSI measurement from the line of best fit at the distance $distance_{ij}$, and the $distance_{ij}$ represents the calculated distance between the two access points corresponding to the RSSI measurement being considered. The position map analysis component 115 could then determine the negative log likelihood measurement for each access point neighboring the access point in question, and could then calculate an average negative log likelihood measure for the access point using the following equation:

Average Negative Log Likelihood $$\text{average\_negative\_log\_likelihood}_i = \left(\sum_{j=1}^{n} -\log\_\text{likelihood}_j\right) / n \quad \text{Equation 3}$$

Here, n represents the number of neighboring access points for an access point i. As shown, Equation 3 states that the average negative log likelihood for the access point i can be determined by calculating the sum of negative log likelihood values for each access point neighboring access point i, and by then dividing by the number of neighboring access points for access point i (i.e., n). The position map analysis component 115 could then calculate an average negative log likelihood value for each access point in the position map.

Once the average negative log likelihood values are determined, the position map analysis component 115 could select the access point having the greatest average negative log likelihood value as the access point incorrectly positioned within the position map. For example, the position map analysis component 115 could sort the average negative log likelihood values calculated for each of the access points, and could select the access point(s) having the highest average negative log likelihood values as being the access point that is most likely incorrectly placed within the position map.

Of note, a selection of an access point by the position map analysis component 115 may not indicate that the access point is in fact incorrectly positioned within the position map, but rather indicates that the selected access point is likely to be incorrectly positioned within the position map. A network administrator could then use such information to, for example, verify the positions of only a subset of the access points within the position map (i.e., only the access points identified by the position map analysis component 115 as likely to be incorrectly positioned).

In one embodiment, each of the plurality of access points is a dual band access point that is capable of transmitting simultaneously on multiple different bands (e.g., a dual band device capable of operating simultaneously on the 5 GHz band of 802.11a and the 2.4 GHz band used by 802.11b, 802.11g and 802.11n). In such an embodiment, the position map analysis component 115 could collect indications of signal strength between the access points on each of the different bands, for use in determining one of the access points that is incorrectly positioned within the position map data structure. By considering the indications of signal strength across the multiple bands, the position map analysis component 115 can consider additional data points, which can lead to more accurate determinations of incorrectly placed access points within the position map.

Figure 3:
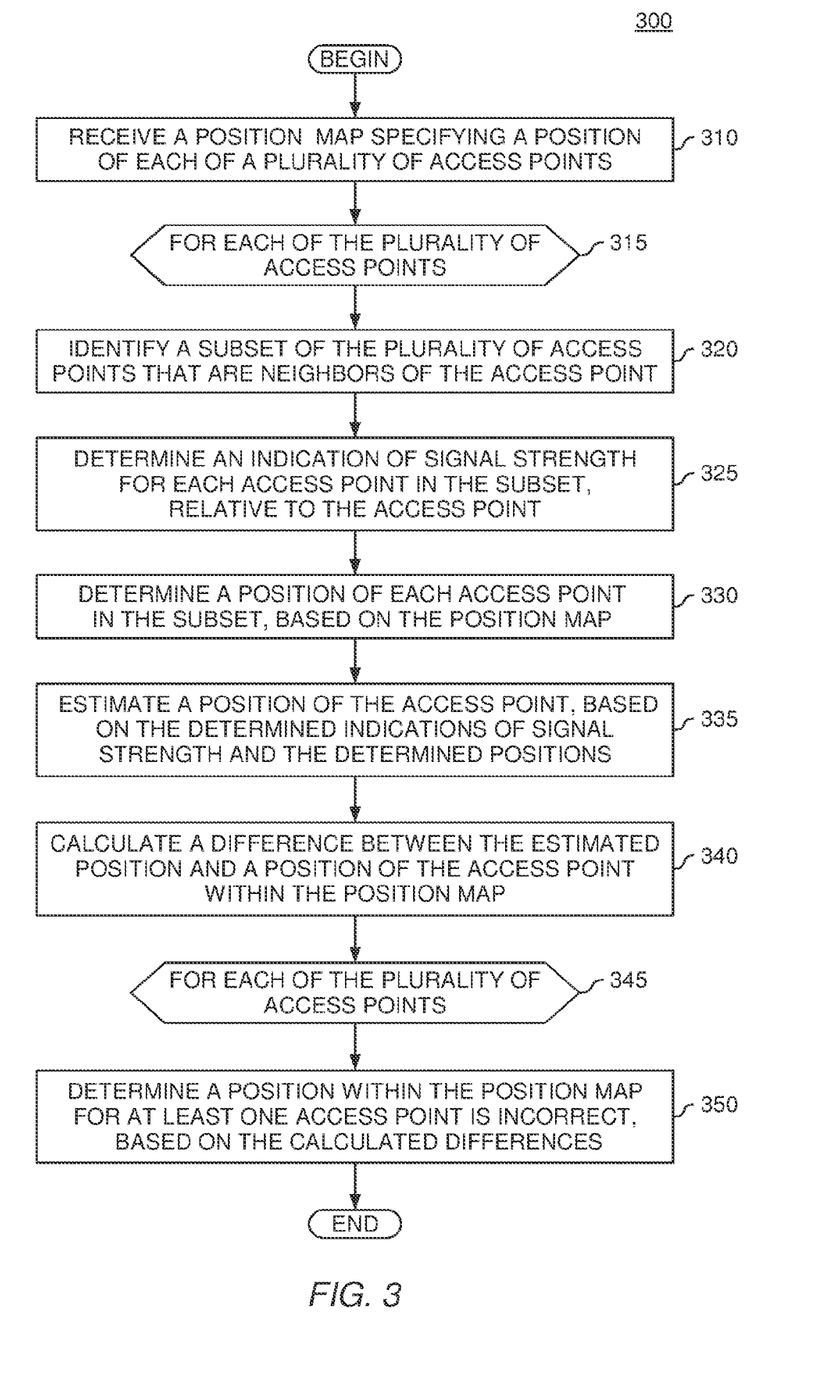
FIG. 3 is a flow diagram illustrating a method for identifying an access point having an incorrect position within a position map, according to one embodiment described herein.

FIG. 3 is a flow diagram illustrating a method for identifying an access point having an incorrect position within a position map, according to one embodiment described herein. As shown, the method 300 begins at block 310, where a position map analysis component 115 receives a position map specifying a position of each of a plurality of access points. Such a position could be specified, for example, using coordinates that uniquely identify a location with a physical environment. The method 300 then enters a loop for each of the plurality of access points (block 315), where the position map analysis component 115 identifies a subset of the plurality of access points that neighbor the access point in question (block 320).

The position map analysis component 115 then determines an indication of signal strength for each access point in the subset, relative to the access point in question (block 325). For example, the indication of signal strength could be a measure of RSSI between the neighboring access point and the access point in question. In one embodiment, where the access points are capable of simultaneously operating on multiple different bands (e.g., dual-band access points), the position map analysis component 115 can determine multiple indications of signal strength between each pair of access points (i.e., one for each band).

Additionally, the position map analysis component 115 determines a position for each of the neighboring access points using the position map (block 330), and estimates a position of the access point in question, based on the indications of signal strength between the access point and the neighboring access points, as well as the determined positions of the neighboring access points (block 335). Once the estimated position for the access point is determined, the position map analysis component 115 calculates a difference between the estimated position and the position of the access point within the position map (block 340).

At block 345, if there are more access points to be considered, the method 300 returns to block 315. Otherwise, the method 300 advances to block 350, where the position map analysis component 115 determines that the position within the position map for at least one of the access points is likely to be incorrect, based on the calculated differences, and the method 300 ends. For example, the position map analysis component 115 could sort the calculated differences and could select the access point having the greatest calculated difference as the access point most likely to have an incorrect position within the position map.

As discussed above, in one embodiment the position map analysis component 115 is configured to calculate a total error value for each of the access points, and to select the access point that is most likely to be incorrectly positioned within the position map based on the total error values. For instance, the position map analysis component 115 could calculate a given access point's total error by applying a weight value to the access point's calculated difference value (i.e., the difference between the access point's estimated position and the access point's position within the position map), and could then add this value to the sum of all the calculated difference values for each of the access points neighbors. The position map analysis component 115 could then select the access point having the greatest total error value, as the access point most likely to be incorrectly positioned within the position map.

Figure 4:
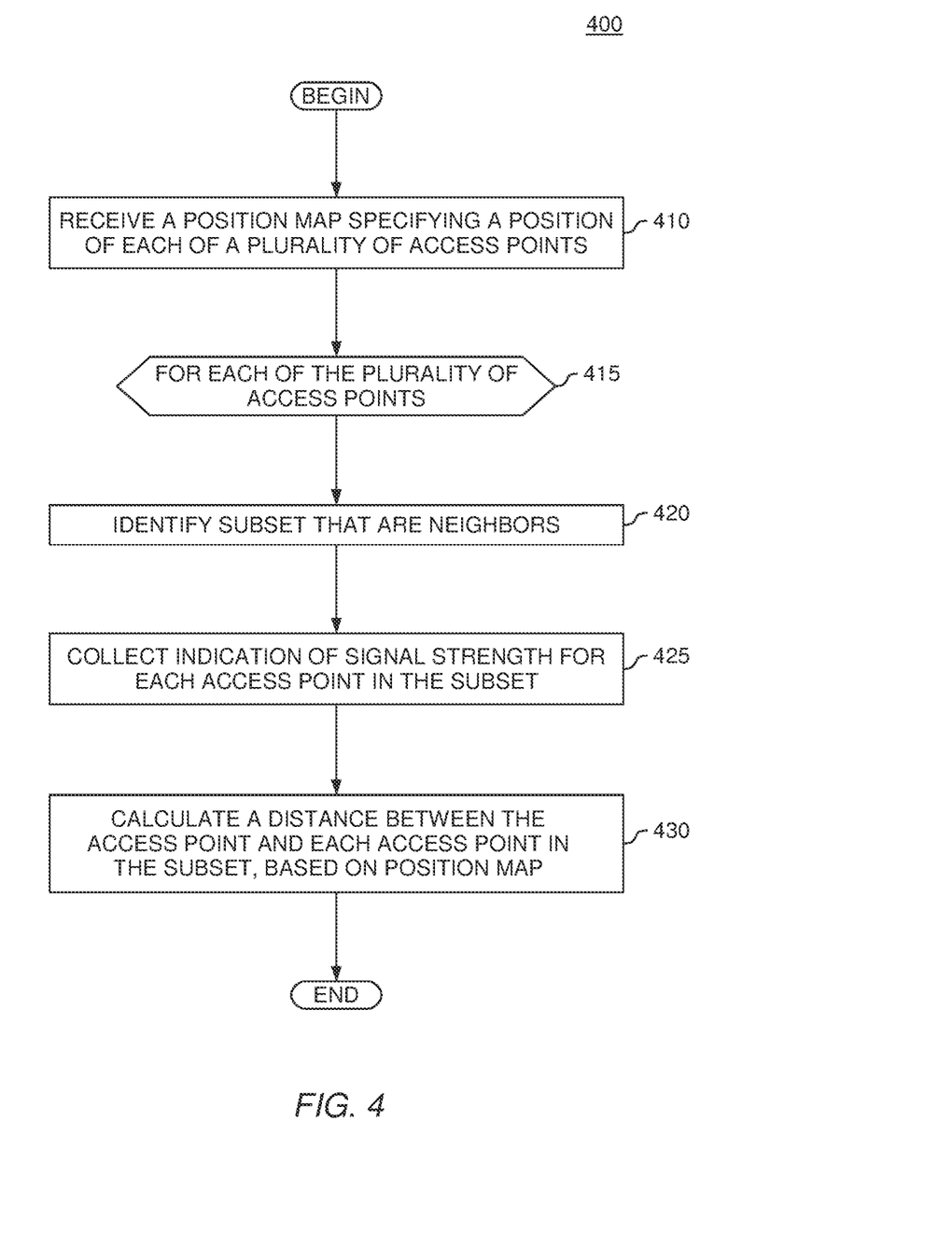
FIG. 4 is a flow diagram illustrating a method for calculating distances between access points within a position map based on measures of signal strength, according to one embodiment described herein.
Figure 5:
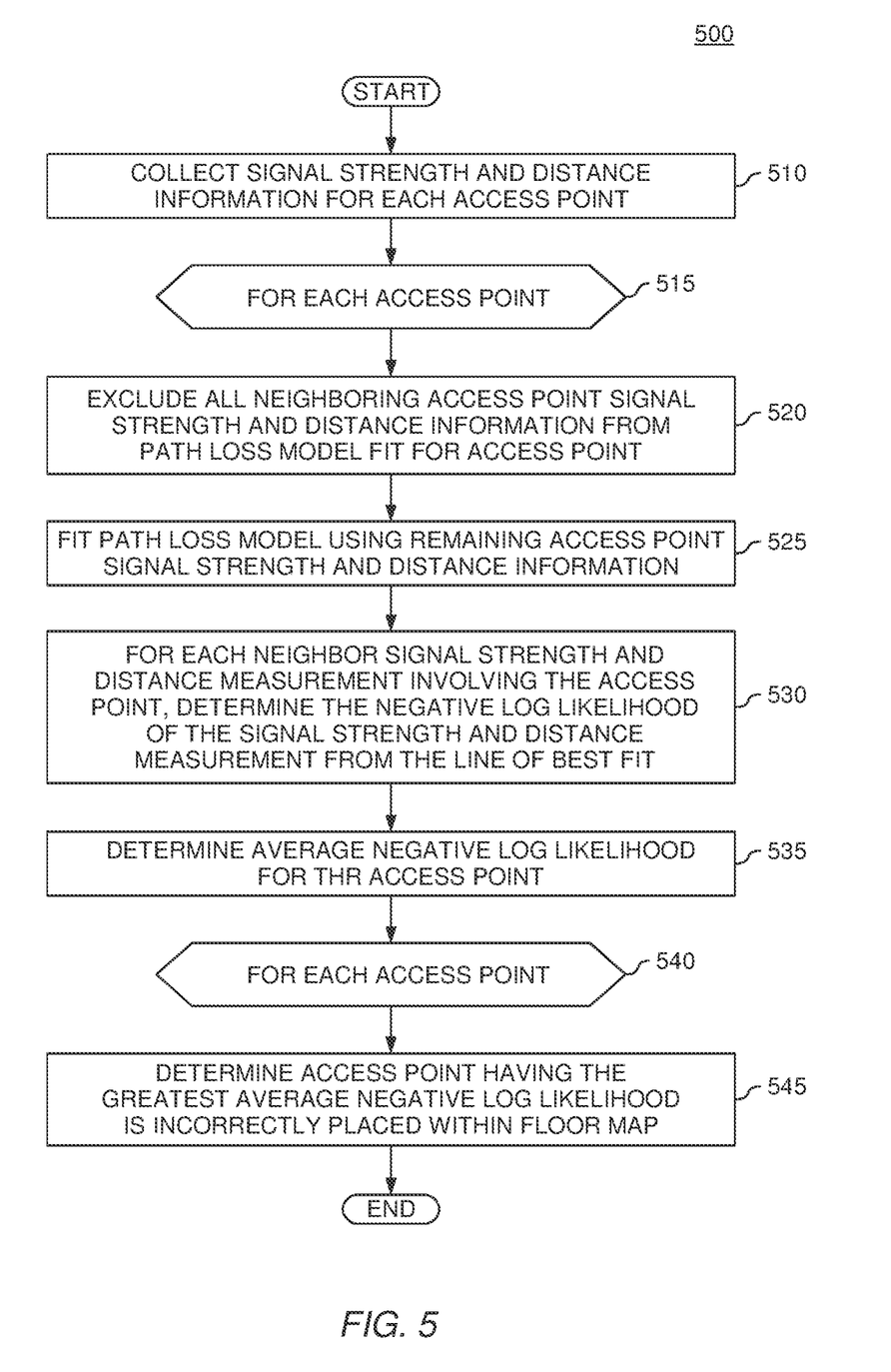
FIG. 5 is a flow diagram illustrating a method for identifying an access point having an incorrect position within a position map, according to one embodiment described herein.

An alternate embodiment of identifying access points that are likely to be incorrectly positioned within a position map is described in FIGS. 4 and 5. FIG. 4 is a flow diagram illustrating a method for calculating distances between access points within a position map based on measures of signal strength, according to one embodiment described herein. As shown, the method 400 begins at block 410, where the position map analysis component 115 receives a position map specifying a position of each of a plurality of access points. The position map analysis component 115 then performs blocks 420, 425 and 430 for each of the plurality of access points, as indicated by block 415. That is, for each access point, the position map analysis component 115 identifies a subset of the plurality of access points that neighbor the access point in question (block 420), and collects indications of signal strength (e.g., RSSI measurements) for each of the neighboring access points (block 425). The position map analysis component 115 also calculates a distance between the access point in question and each of its neighbors, based on the positions of the access points within the position map (block 430), and the method 400 ends.

FIG. 5 is a flow diagram illustrating a method for identifying an access point having an incorrect position within a position map, according to one embodiment described herein. As shown, the method 500 begins at block 510, where the position map analysis component 115 collects signal strength and distance information for each access point in the position map. For example, the position map analysis component 115 could collect such information using the method 400 described above.

The method 500 then enters a loop from blocks 515 to 540, where the position map analysis component 115 performs blocks 520, 525, 530 and 535 for each access point in the position map. As shown, the position map analysis component 115 excludes all neighboring access point signal strength and distance information from the data set, for purposes of fitting a path loss model to the data (block 520). The position map analysis component 115 then fits a path loss model using the remaining signal strength and distance information, in order to determine a line of best fit for the data set (block 525). The position map analysis component 115 then, for each neighbor to the access point in question, determines a negative log likelihood of the signal strength and distance measurement, based on the line of best fit (block 530). For example, the position map analysis component 115 could calculate the negative log likelihood using Equation 2 discussed above.

Once the negative log likelihood is calculated for each neighboring access point, the position map analysis component 115 calculates an average negative log likelihood for the access point by averaging all of the neighboring negative log likelihood values (block 535). For example, the position map analysis component 115 could calculate the average value using Equation 3 discussed above. Once the position map analysis component 115 has calculated the average negative log likelihood value for each of the access points, the position map analysis component 115 determines that the access point having the greatest average log likelihood value is the access point most likely to be incorrectly positioned within the position map (block 545), and the method 500 ends. For example, the position map analysis component 115 could sort all of the average negative log likelihood values, and could select the greatest value as identifying the access point most likely to be incorrectly positioned within the position map.

The position map analysis component 115 could then, for example, generate a notification (e.g., within a graphical user interface) identifying the access point as likely to be incorrectly positioned. A network engineer could then verify the access point's position within the physical environment. By calling specific access points to the network engineer's attention that are likely to be incorrectly positioned, the position map analysis component 115 is able to drastically reduce the network engineer's workload, as the network engineer need only verify the positions of the designated access point(s), as opposed to the positions of all of the access points within the wireless network.

Figure 6:
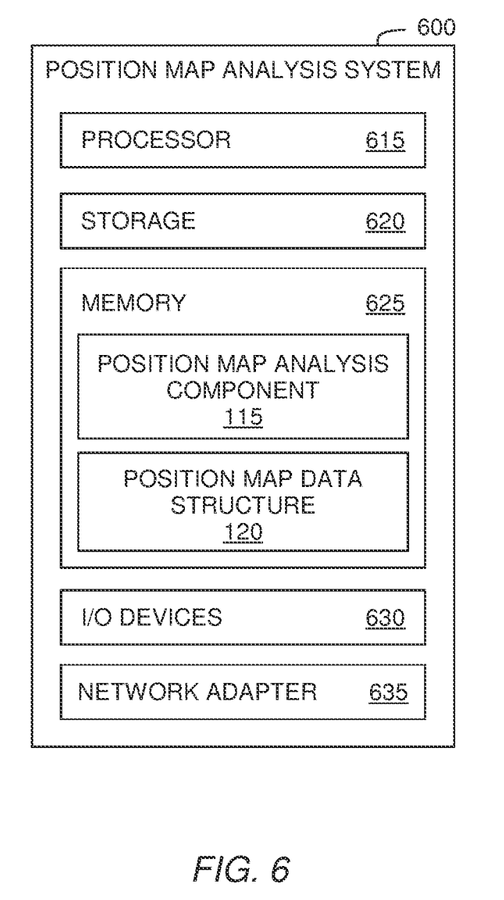
FIG. 6 is a block diagram illustrating a system configured with a position map analysis component, according to one embodiment described herein.

FIG. 6 is a block diagram illustrating a system configured with a position map analysis component, according to one embodiment described herein. The position map analysis system 600 includes a processor 615, storage 620, memory 625, input/output (I/O) devices 630 and a network adapter 635. The processor 615 may be any processing element capable of performing the functions described herein. The processor 615 represents single processor, multiple processors, a processor with multiple cores, and combinations thereof. Storage 620 represents any non-volatile memory (e.g., a disk drive) on the position map analysis system 600 or accessible by the position map analysis system 600.

The memory 625 may be either volatile or non-volatile memory and include, RAM, flash, cache, disk drives and the like. Although shown as a single entity, the memory 625 may be divided into different memory storage elements such as RAM and one or more hard disk drives. Here, the memory 625 includes a position map analysis component 115 and a position map data structure 120. The network adapter 635 facilitates communication between the position map analysis system 600 and a network. Here, the network is representative of any data communications network on which the position map analysis system could transmit data, including wired networks, wireless networks, etc. Examples of the network include a local area network, the Internet, a Bluetooth® communication link, and so on.

As discussed above, the position map analysis component 115 is configured to, for each access point in a plurality of access points in the position map data structure 120, identify a subset of the plurality of access points that neighbor the access point. Additionally, the position map analysis component 115 can estimating a location of each of the access points, based on a respective indication of signal strength from each neighboring access point in the subset of access points and a respective position of each of the neighboring access points in position map. The position map analysis component 115 could then calculate a difference between a recorded position of the access point in the position map and the estimated location of the access point, and could determine that the position within the position map for a first one of the plurality of access points is likely to be incorrect, based on the determined difference for the first access point.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, the position map analysis component 115 could be deployed on a node located in the cloud, and could receive a position map data structure 120 and signal strength information for a plurality of access points within a remote WLAN. The position map analysis component 115 could then determine a position for one of the access points within the position map is incorrect, based on the received signal strength information and the positions of the access points within the position map. Doing so allows users to access the position map analysis component 115 from any computing system connected to the cloud computing environment (e.g., via the Internet).

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
  generating, by operation of one or more computer processors, a set of signal strength and distance data, comprising, for each access point in a plurality of access points:
    identifying a subset of the plurality of access points that neighbor the access point;
    collecting indications of signal strength for each of the access points in the subset, relative to the access point;
    calculate a distance between the access point and each of the access points in the subset, based on a position map;
    generating a line of best fit to the set of signal strength and distance data for each of the plurality of access points;
    determining a likelihood value for each of the plurality of access points,
    by determining a respective average negative log likelihood value based on the line of best fit, the indications of signal strength and the calculated distance for the access point; and determining the position within the position map for a first one of the plurality of access points is likely to be incorrect, by selecting an access point having the greatest average negative log likelihood value based on the determined likelihood values for each of the plurality of access points.

2. The method of claim 1, wherein generating the line of best fit to the set of signal strength and distance data further comprises:
fitting a path loss model to the set of signal strength and distance data.

3. The method of claim 1, further comprising:
excluding all indications of signal strength and distance information relating to neighbors of the access point from the set of signal strength and distance data,
wherein generating the line of best fit to the set of signal strength and distance data for each of the plurality of access points is based on the set of signal strength and distance data with the neighboring information excluded.

4. The method of claim 1, wherein the indication of signal strength comprises at least one of a received signal strength indication (RSSI) measure, a time of arrival measurement, a one way transit time measurement and a round trip time measurement.

5. The method of claim 4 wherein collecting indications of signal strength for each of the access points in the subset, relative to the access point, comprises:
collecting indications of signal strength across multiple different signal bands.

6. The method of claim 1, wherein the position map specifies a respective position for each of the plurality of access points within a physical environment.

7. The method of claim 6, wherein the position is specified using coordinates specifying a position within the physical environment.

8. The method of claim 1, further comprising:
upon determining the position within the position map for the first access point is likely to be incorrect, generating a notification specifying at least the first access point.

9. A method, comprising:
receiving a position map specifying a respective position for each of a plurality of access points within a physical environment;
collecting indications of signal strength from each of the plurality of access points; and
analyzing, by operation of one or more computer processors, the indications of signal strength and the position map to determine that a position of a first one of the plurality of access points within the position map is likely to be incorrect, in that the position of the first access point within the position map does not correspond to a position of the first access point within the physical environment, comprising:
plotting a line of best fit using a path loss model;
determining a likelihood value for each of the plurality of access points, by determining a respective average negative log likelihood value based on the line of best fit and the indication of signal strength and a calculated distance for the access point; and
selecting an access point having the greatest average negative log likelihood value.

10. The method of claim 9, further comprising:
upon determining that the position within the position map for the first access point is likely to be incorrect, generating a notification specifying at least the first access point.

11. The method of claim 9, where analyzing the indications of signal strength and the position map to determine that the position of the first one of the plurality of access points within the position map is likely to be incorrect, further comprises:
upon determining the likelihood value for each of the plurality of access points, determining that the position of the first access point within the position map is likely to be incorrect based on a determination that the corresponding likelihood value for the first access point exceeds a predefined threshold amount of likelihood.

12. A non-transitory computer-readable medium containing computer program code that, when executed by operation of one or more computer processors, performs an operation comprising:
generating a set of signal strength and distance data, comprising, for each access point in a plurality of access points:
identifying a subset of the plurality of access points that neighbor the access point;
collecting indications of signal strength for each of the access points in the subset, relative to the access point;
calculate a distance between the access point and each of the access points in the subset, based on a position map;
generating a line of best fit to the set of signal strength and distance data for each of the plurality of access points;
determining a likelihood value for each of the plurality of access points, by determining a respective average negative log likelihood value based on the line of best fit, the indications of signal strength and the calculated distance for the access point; and
determining the position within the position map for a first one of the plurality of access points is likely to be incorrect, by selecting an access point having the greatest average negative log likelihood value based on the determined likelihood values for each of the plurality of access points.

13. The non-transitory computer-readable medium of claim 12, wherein generating the line of best fit to the set of signal strength and distance data further comprises:
fitting a path loss model to the set of signal strength and distance data.

14. The non-transitory computer-readable medium of claim 12, the operation further comprising:
excluding all indications of signal strength and distance information relating to neighbors of the access point from the set of signal strength and distance data,
wherein generating the line of best fit to the set of signal strength and distance data for each of the plurality of access points is based on the set of signal strength and distance data with the neighboring information excluded.

15. The non-transitory computer-readable medium of claim 12, wherein the indication of signal strength comprises at least one of a received signal strength indication (RSSI) measure, a time of arrival measurement, a one way transit time measurement and a round trip time measurement.

16. The non-transitory computer-readable medium of claim 15, wherein collecting indications of signal strength for each of the access points in the subset, relative to the access point, comprises:
collecting indications of signal strength across multiple different signal bands.

17. The non-transitory computer-readable medium of claim 12, wherein the position map specifies a respective position for each of the plurality of access points within a physical environment.

* * * * *